United States Patent
Grossetete (10) Patent No.: US 9,905,321 B2
(45) Date of Patent: Feb. 27, 2018

(54) METHOD FOR OPERATING A PRESSURIZED WATER REACTOR DURING LOAD MONITORING

(75) Inventor: Alain Grossetete, Nanterre (FR)

(73) Assignee: Areva NP, Courbevoie (FR)

( * ) Notice: Subject to any disclaimer, the term of this patent is extended or adjusted under 35 U.S.C. 154(b) by 1054 days.

(21) Appl. No.: 14/005,065

(22) PCT Filed: Mar. 15, 2012

(86) PCT No.: PCT/FR2012/050548
§ 371 (c)(1),
(2), (4) Date: Oct. 14, 2013

(87) PCT Pub. No.: WO2012/123685
PCT Pub. Date: Sep. 20, 2012

(65) Prior Publication Data
US 2016/0329116 A1    Nov. 10, 2016

(30) Foreign Application Priority Data
Mar. 15, 2011   (FR) ..................................... 11 52101

(51) Int. Cl.
*G21C 7/08* (2006.01)
*G21D 3/00* (2006.01)
(Continued)

(52) U.S. Cl.
CPC ............... *G21D 3/001* (2013.01); *G21C 7/08* (2013.01); *G21C 7/22* (2013.01); *G21D 3/10* (2013.01);
(Continued)

(58) Field of Classification Search
CPC . G21D 3/001; G21D 3/10; G21D 3/16; G21C 7/22; G21C 7/08
(Continued)

(56) References Cited

U.S. PATENT DOCUMENTS 4,057,463 A * 11/1977 Morita ..................... G21D 3/16
376/218
4,642,213 A * 2/1987 Impink .................... G21C 7/00
376/218

(Continued)

*Primary Examiner* — Jack W Keith
*Assistant Examiner* — Daniel Wasil
(74) *Attorney, Agent, or Firm* — Pearl Cohen Zedek Latzer Baratz LLP (57) ABSTRACT

The present invention relates to a method for controlling a pressurized water reactor (100) comprising the steps that involve measuring the effective power (Pe) of the nuclear reactor; acquiring a reference value for the desired power (Pc); acquiring an estimated duration (DURATION) for the increase in power in order to achieve said reference value of the target power (Pc) desired, said estimated duration (DURATION) corresponding to the time taken for the power to increase from said effective power (Pe) to said reference value for the target power (Pc); determining the reference position (Z) of at least one control rod cluster among said plurality of control rod clusters (40) in order to achieve said reference value for said target power (Pc) desired as a function of said estimated duration (DURATION), of said measured effective power (Pe) and of said reference value for said target power (Pc); monitoring the position of said at least one control rod cluster so as to position it in its reference position (Z).

6 Claims, 4 Drawing Sheets (51) Int. Cl.
*G21C 7/22* (2006.01)
*G21D 3/10* (2006.01)
*G21D 3/16* (2006.01)

(52) U.S. Cl.
CPC ............... G21D 3/16 (2013.01); *Y02E 30/32* (2013.01); *Y02E 30/39* (2013.01)

(58) Field of Classification Search
USPC ..................... 376/217, 218, 241, 258, 259
See application file for complete search history.

(56) References Cited

U.S. PATENT DOCUMENTS

| | | | | |
|---|---|---|---|---|
| 4,844,856 A | * | 7/1989 | Cohen ...................... | G21C 7/08 376/217 |
| 2008/0069288 A1 | * | 3/2008 | Grossetete ............... | G21C 7/08 376/217 |
| 2012/0033778 A1 | * | 2/2012 | Kauchi ................... | G21C 7/00 376/245 |

* cited by examiner

METHOD FOR OPERATING A PRESSURIZED WATER REACTOR DURING LOAD MONITORING

CROSS-REFERENCE TO RELATED APPLICATIONS

This application is a National Phase Application of PCT International Application No. PCT/FR2012/050548, International Filing Date Mar. 15, 2012, claiming priority of French Patent Application No. 1152101, filed Mar. 15, 2011, both of which are hereby incorporated by reference.

FIELD OF THE INVENTION

The present invention relates to a method for operating a pressurized water nuclear reactor during load follow.

BACKGROUND OF THE INVENTION

Figure 1:
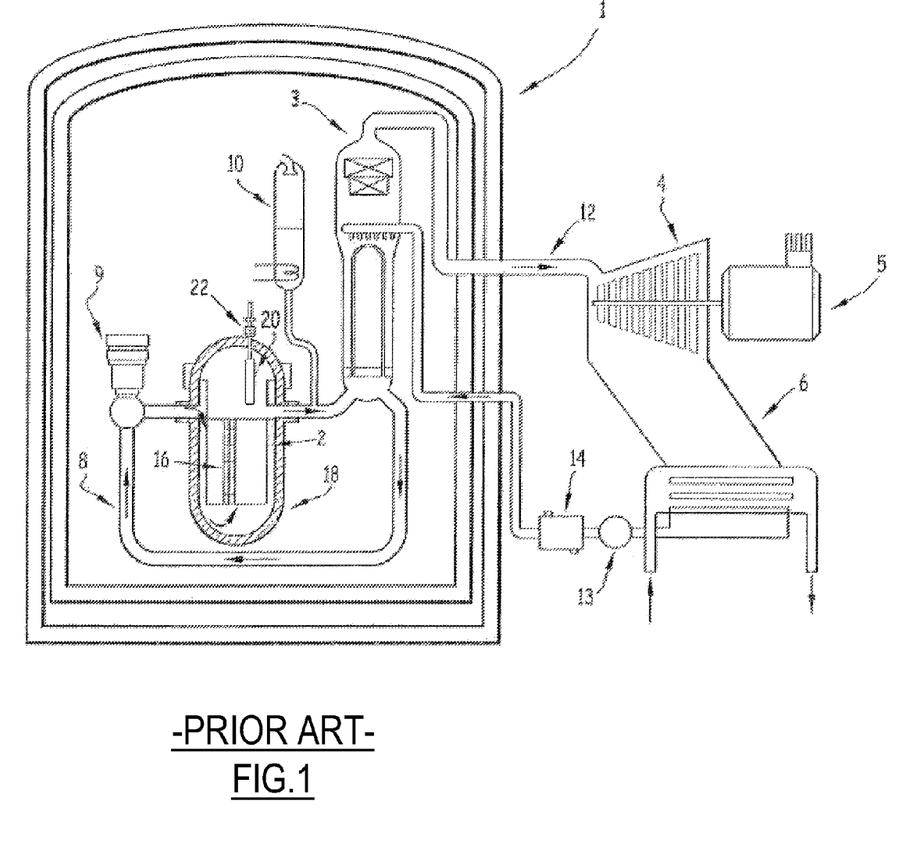
FIG. 1 schematically illustrates a pressurized water reactor.

FIG. 1 schematically illustrates such a pressurized water nuclear reactor 1, which comprises in a conventional manner:

a core 2 divided into an upper area and a lower area and producing power, steam generators 3, a single generator being represented, a turbine 4 coupled to an electric power generator 5, and a condenser 6.

The reactor 1 also comprises a primary circuit 8 equipped with pumps 9, a single pump being represented, and in which pressurized water circulates, along the path indicated by the arrows. This water rises particularly to the core 2 to be heated therein while assuring the cooling of the core 2. The water also assures a function of moderation, in other words of slowing down the neutrons produced by the nuclear fuel.

The primary circuit 8 further comprises a pressuriser 10 making it possible to regulate the pressure of the water circulating in the primary circuit 8.

The water of the primary circuit 8 also supplies the steam generators 3 where it is cooled while assuring the vaporisation of water circulating in a secondary circuit 12.

The steam produced by the generators 3 is channelled by the secondary circuit 12 to the turbine 4 then to the condenser 6 where said steam is condensed by indirect heat exchange with the cooling water circulating in the condenser 6.

The secondary circuit 12 comprises, downstream of the condenser 6, a pump 13 and a heater 14.

The core 2 comprises fuel assemblies 16 which are loaded in a vessel 18. A single assembly 16 is represented in FIG. 1, but the core comprises a plurality of assemblies 16.

The fuel assemblies 16 comprise nuclear fuel rods formed, in a conventional manner, of an alloy cladding, based on zirconium, enclosing a stack of nuclear fuel pellets based on uranium oxide or a mixture of uranium oxide and plutonium oxide.

The reactor 2 comprises control rods 20, also known as control rod clusters, for controlling the reactivity of the core, which are arranged in the vessel 18, above certain assemblies 16, and which are capable of occupying a plurality of insertion positions in the core. A single rod 20 is represented in FIG. 1, but the core 2 comprises several tens of control rod clusters 20. The control rods 20 can be moved vertically by mechanisms 22 so as to be inserted, in different insertion positions, in the fuel assemblies 16 that they overhang.

In a conventional manner, each control rod 20 comprises a plurality of control pencils made of neutron absorbing material.

Thus, the vertical movement, or insertion state, of each rod 20 inside the fuel assemblies 16 makes it possible to regulate the reactivity of the core of the reactor 1, thereby authorising variations in the overall power supplied by the core 2, from zero power up to rated power (hereafter noted RP).

It may prove to be useful, in fact, particularly in countries such as France where 80% of the electricity is produced by nuclear reactors, that the overall power supplied by the reactors varies in order to adapt to the needs of the grid that they supply; this is then known as grid monitoring or load follow.

During load follow, the power produced by the reactor is regulated so as to correspond to a programme pre-established by the service operating the grid.

The adjustment of the power supplied by the reactor is achieved by operating means positioning control rods constituted of neutrophage element in different insertion positions in the core so as to absorb more or less the neutrons and/or by optionally adjusting the concentration of a neutron absorbing compound, such as boron, in the primary coolant, as a function of the desired power and/or measurements from the instrumentation of the core of the reactor.

For example, the operating means are formed of a set of electronic and electrical equipment which, from measurements from instrumentation chains and by comparing them to limit levels, elaborate orders of movement of control rods 20 and/or modification of the boron concentration in the primary coolant by injection of water (dilution) or boron (boronation).

Different modes of operating a pressurized water nuclear reactor are known. Generally speaking, the operation consists in controlling and regulating to the minimum the average temperature of the primary coolant Tav and the distribution of power (thermal and neutronic) and in particular the axial distribution of power DA in order to avoid the formation of a power imbalance between the upper area and the lower area of the core.

The methods of regulation of these parameters vary as a function of the different operating modes used. Generally speaking, the average temperature $T_{av}$ is regulated by the movement of the control rods 20 as a function of different parameters such as the power required at the turbine, the standard value of the temperature of the coolant, and/or optionally by modification of the boron concentration in the primary coolant, which makes it possible indirectly to adapt the positions of the control rods 20 to a desired position, particularly in order to obtain an axial distribution of desired power DA and/or a capacity of rapid rise in the power of the core to the desired power.

The choice of the mode for operating a nuclear reactor is determined by taking into consideration the fact that the action of the control rods has immediate effects, whereas the action by injection of boron in solution is comparatively slower.

Moreover, the increase in the boron concentration in solution in the primary coolant requires boric acid storage and injection means and thus imposes additional design constraints.

Thus, there is a tendency only to use the injection of boron or water in solution to correct the long term effects on the operating reactivity of the reactor, in other words essentially the xenon effect and the ageing of the fuel.

In order to meet the needs of the grid, the operation of the reactor is thus preferentially carried out by the movement of the control rods.

However, the insertion of the control rods affects, in a prejudicial manner, the axial distribution of power produced in the reactor. This may result in the formation of power peaks in the core as well as the development of oscillations of the xenon concentration in the longer term, favourable to the accentuation of these power peaks, factors intervening in a restrictive manner in the operating procedure and imposing a corrective recourse by modifying the boron concentration in the primary coolant.

Yet, in load follow, in other words with a power production level following a daily curve, and even in slave mode, by remote control, the variations in power production multiply the control actions, with the aforementioned unfavourable consequences, engaging in an important manner the control rod mechanisms and leading to considerable volumes of effluents due to repeated operations of dilution and boronation of the coolant.

In order to meet these difficulties, methods for operating a pressurized water reactor have been developed determining the positions of the control rods in the core, making it possible to limit perturbations of the axial power distribution and resorting to the use of boron, the concentration of which is adjusted so as to mainly compensate the effects of the release of xenon and the ageing of the fuel rods.

However, this operating method is not always optimised and does not always make it possible to minimise the volumes of effluents as well as the movement of the control rod clusters. In addition, the minimisation of the volumes of effluents as well as the engaging of the control rod insertion mechanisms remains a permanent concern of the operator.

SUMMARY OF THE INVENTION

In this context, the invention aims to resolve the aforementioned problems by making it possible to optimise the reference position of the control clusters in the core of the reactor, minimise the movements of said clusters and thereby optionally minimise the volumes of effluents generated by the operations of dilution/boronation of the primary coolant during power variations of the reactor.

To this end, the invention proposes a method for operating a pressurized water reactor, said reactor comprising:
 a core producing power;
 a plurality of control rod clusters for controlling the reactivity of said core capable of occupying in the core a plurality of insertion positions staged vertically from a high position;
 means for acquiring quantities representative of the operating conditions of the core;
 said method comprising the steps that involve:
 measuring the effective power of the nuclear reactor;
 acquiring a reference value for the desired target power of the nuclear reactor;
 said method being characterised in that it further comprises the steps that involve:
 acquiring an estimated duration for the increase in power in order to achieve said reference value for the desired target power, said estimated duration corresponding to the time taken for the power to increase from said effective power to said reference value for the target power;
 determining the reference position of at least one control rod cluster among said plurality of control rods in order to achieve said reference value for said desired target power as a function of said estimated duration, of said measured effective power and of said reference value for said target power;
 monitoring the position of said at least one control rod cluster so as to position it in its reference position (Z).

Thanks to the invention, it is possible to optimise the reference position of the control rods during load follow by taking into account the evolution of the xenon effect, neutrophage element, intervening during said load follow. The optimised reference position is determined by taking into account a time parameter representative of the estimation of the duration for the increase in power to achieve the reference value for the desired target power As an example, the reference position retained could be that giving the best behaviour of the core during the power rise, in other words the position enabling the control rods to find themselves in the optimal position when the target power is achieved. For example, the optimal position of the control rods at 100% rated power, which can be the normal position of the control rods in 100% stabilised operation (i.e. the nominal position of the control rods).

Thanks to the method according to the invention, it is also possible to minimise the volumes of effluents in the core of the reactor by suitable management of the dilution and boronation operations while preserving the control rod movement mechanisms by the reduction in the number of steps of the control rods by limiting the movements of the control rods uniquely to movements necessary for the power variation within the desired duration.

According to another characteristic, the method comprises a step consisting in acquiring an estimated instant of the start of said power increase, said estimated instant corresponding to the end of the stage of said effective power and being taken into account in the step of determining the reference position of at least one control rod cluster.

According to another characteristic, the control step is carried out so that said at least one control rod cluster is positioned in its reference position at the latest at the start of said power increase.

According to another characteristic, the method comprises a step of regulation of the concentration of a neutrophage element such as boron in the coolant as a function of said reference position of at least one control rod cluster among said plurality of control rods. Regulation is taken to mean one or more operations of reduction or increase in the concentration of said neutrophage element such as boron (i.e. dilution or boronation) in the primary coolant of the nuclear reactor.

According to another characteristic, said step of determining said reference position of said at least one control rod cluster is carried out via software means implementing a neutron code. Neutron code is taken to mean a code resolving periodically the diffusion equation and updating the isotope balance of the core during the burnup of the fuel.

According to another characteristic, said step of determining said reference position of said at least one control rod cluster comprises:
 a sub-step of determining a first position of at least one control rod cluster as a function of said measured effective power and said reference value for the target power;
 a sub-step of determining the variation in the xenon concentration in said core of said reactor during the future power increase, said variation in xenon concentration being a function of said estimated duration, and/or of said measured effective power and/or of said reference value for the target power;

a sub-step of determining a corrective factor of the position of at least one control rod cluster as a function of said variation in the xenon concentration.

According to another characteristic, said step of determining said reference position of said at least one control rod cluster comprises:
- a sub-step of determining a first position of at least one control rod cluster as a function of said effective measured power and of said reference value for the target power;
- a sub-step of determining the variation in the xenon concentration in said core of said reactor during the future power increase, said variation in xenon concentration being a function of said estimated duration, and/or of said measured effective power and/or of said reference value for the target power, and/or of said estimated instant of start of the increase in power;
- a sub-step of determining a corrective factor of the position of at least one control rod cluster as a function of said variation in the xenon concentration.

BRIEF DESCRIPTION OF THE DRAWINGS

Other characteristics and advantages of the invention will become clearer from the description thereof that is given hereafter by way of indication and in no way limiting, with reference to the appended figures, among which.

DETAILED DESCRIPTION OF THE INVENTION

FIG. 1 has already been described previously with reference to the general presentation of the invention.

Figure 2:
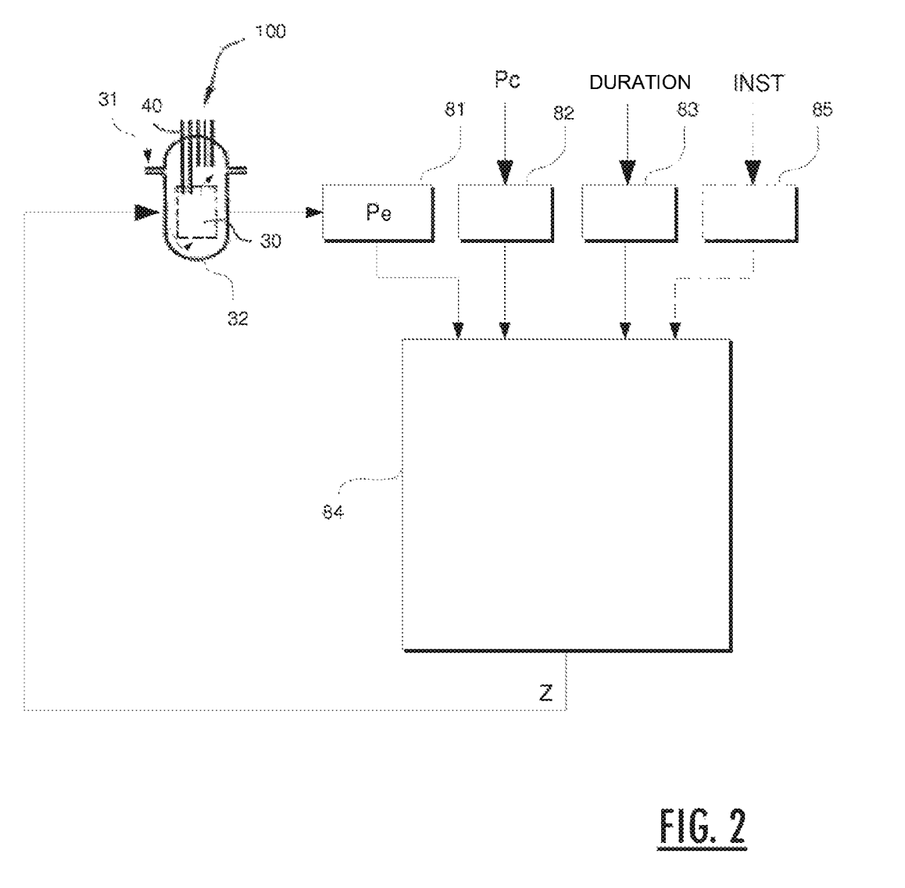
FIG. 2 is a schematic representation illustrating the different steps of the method according to the invention.

FIG. 2 illustrates in a schematic manner the main steps of the optimisation method according to the invention aiming to manage a nuclear reactor and particularly a pressurized water reactor.

A pressurized water reactor is represented in a symbolic manner by the reference 100, in FIG. 2 and comprises as indicated previously in FIG. 1:
- a core 30 comprising nuclear fuel assemblies;
- a vessel 32 comprising the core 30 of the reactor;
- steam generators (not represented) able to drive an alternator coupled to the electrical distribution grid;
- a primary circuit 31 connecting in closed circuit the vessel 32 to a primary side of the steam generator;
- a secondary circuit (not represented) connecting in closed circuit a secondary side of the steam generators to a turbine.

The primary circuit 31 is able to assure the circulation through the core 30 of a pressurized primary coolant along the path indicated by the arrows. The primary coolant is essentially formed of water and dissolved boron. The coolant rises to the core 30, heating up on contact with the fuel assemblies, thereby assuring the cooling of the core 30. The primary coolant also supplies the steam generators, where it is cooled by giving up its heat. The secondary circuit is able to assure the circulation of a secondary coolant, essentially comprising water, said liquid being vaporised in the steam generators by the heat given up by the primary fluid. The steam produced by the generators is channelled to the turbine that it drives, then to a condenser in which the steam is condensed by indirect heat exchange with the cooling water circulating in the condenser. The condensed steam is then sent to the steam generators.

The alternator coupled to the turbine supplies to the grid an electric power, variable as a function of grid demand. The reactor 100 is thus operated so as to adapt permanently the power supplied by the core to the electric power required by the grid, by varying the reactivity of the core.

In this aim, the reactor 100 further comprises:
- means for adjusting the boron concentration (not represented) dissolved in the primary coolant, by injection of a solution of concentrated boric acid into the primary liquid in order to vary the concentration of boron upwards, or by injection of pure water in order to vary the concentration of boron downwards;
- control rods 40 for controlling the reactivity of the core 30, each of the rods 40 being capable of occupying in the core 30 a plurality of insertion positions staged vertically from a high position;
- means for selectively inserting each control rod cluster into the core 30, from the top down, down to one of the insertion positions determined by the method;
- means for acquiring quantities representative of the operation of the reactor, such as: the neutron flux, the temperature of the primary liquid in the cold branch TBF of the primary circuit, the temperature of the primary liquid in the hot branch TBC of the primary circuit, the position of the control clusters 40;
- means for measuring the effective power Pe of the core from quantities representative of the operation of the reactor;
- means for acquiring operating references set by an operator by means of a human/machine interface (not represented).

The operating method according to the invention represented in FIG. 2 makes it possible to minimise the movements of the control rods 40 during load follow by the determination of a reference position Z for the control rods 40 taking into account the variation in the xenon effect during load restoration, the method determining the position of the control rods 40 as a function of the estimated duration of the return power increase.

The method according to the invention comprises a first step of acquisition of the effective power Pe, illustrated by block 81.

During steps illustrated respectively by blocks 82 and 83, the acquisition means acquire a reference value for the target power Pc, that it is wished to achieve, as well as a duration DURATION corresponding to the estimated time interval of the increase in power of the reactor to achieve the reference value Pc starting from the value of the effective power Pe.

These reference values Pc, DURATION are entered by the operator during the programming of the load follow via a human/machine interface (not represented).

The operating method further comprises a step of determining the reference position Z of the control rods 40, illustrated by block 84. The position Z of the control rods 40 is determined as a function of the value of the effective power Pe, of the reference power value Pc, of the estimated time interval DURATION of the increase in power of the reactor to achieve the reference value Pc.

According to an embodiment variant, the acquisition means also acquire a complementary value corresponding to an estimated instant of the load restoration INST (i.e. the instant of end of the duration of the stage of the effective power). Thus, in this embodiment variant, the determination of the position Z of the control rods 40 will be more precise and a function of the value of the effective power Pe, of the reference power value Pc, of the estimated time interval DURATION of the increase in power of the reactor to achieve the reference value Pc as well as of the estimated instant of load restoration INST.

According to a first embodiment of the method according to the invention, the step 84 of determining the reference position Z of the control rods 40 is carried out by software means present in the nuclear reactor 100 implementing a neutron computation code simulating the behaviour of the reactor from data representative of the material, geometric and neutronic characteristics of the core, as well as the operating conditions of the core, continuously, representing the 3D model of the core.

As an example, the SMART neutron computation code based on 3D modelling of advanced nodal type may be cited. The principles of core neutron computation are described in more detail in the document "*Methods de calcul neutronique de coeur*" (Techniques de l'Ingenieur—B 20 3 070—Giovanni B. Bruna and Bernard Guesdon).

These software means implementing a neutron computation code make it possible to determine by iterative computation the ideal reference position Z of the control rods from entry data, such as the effective power Pe, the reference value Pc of the target power that it is wished to achieve and the estimated duration DURATION of the increase in power, and optionally the estimated instant of load restoration INST, entered by the operator.

As an example, the reference position Z retained by the software means could be that giving the best behaviour of the core during the power rise, in other words the position enabling the control rods 40 to return to the optimal position when the target power is achieved. The optimal position of control rods 40 at 100% rated power which can be the normal position of the control rods in 100% stabilised operation (i.e. the nominal position of the control rods).

Figure 3:
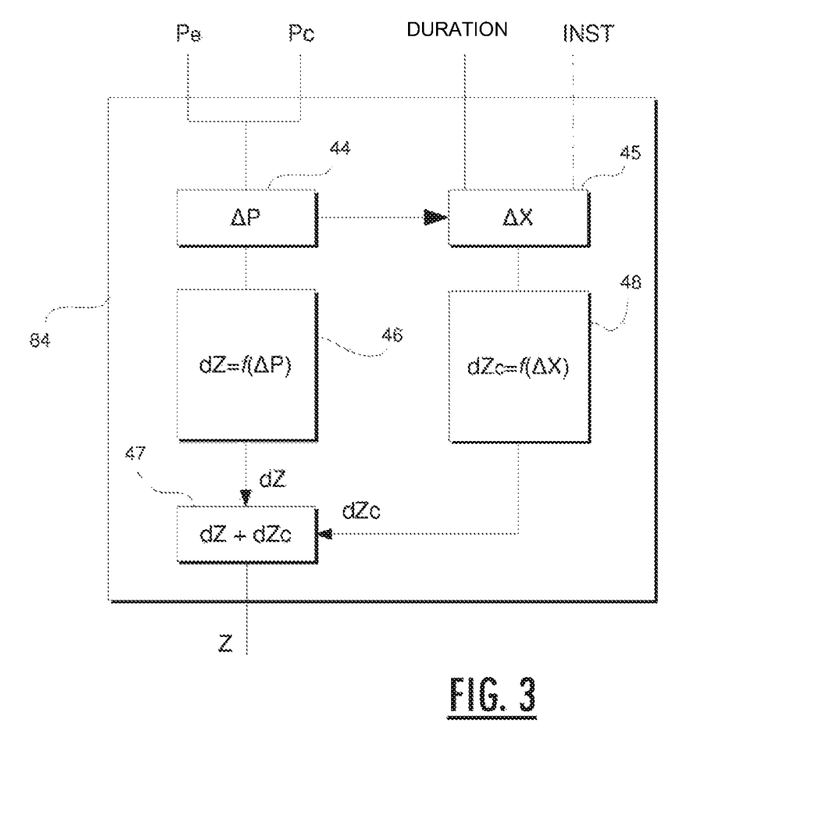
FIG. 3 illustrates a second embodiment of the step of determining the reference position Z of the method according to the invention illustrated in FIG. 2.

FIG. 3 illustrates a second mode of implementation of the step 84 of determining the reference position Z of the control rods 40. This second mode of implementation makes it possible to simplify this step of determination in comparison with the previous embodiment and makes it possible to do without the use of a neutron computation code.

According to this second mode, comparison means make it possible during a sub-step, illustrated by block 44, to compare the difference $\Delta P$ between the effective power Pe and the reference value Pc for the target power that it is wished to achieve.

The operating means comprise software means associated with storage means comprising a correlation table $dZ=f(\Delta P)$ making it possible to define, during the step illustrated by block 46, a position dZ of control rods as a function of the difference $\Delta P$ in the power. The position dZ determined during this step corresponds to the insertion position of the control rods in which it is possible to achieve the reference value Pc for the power without necessity of compensation of the xenon effect.

Block 45 illustrates a complementary step in which the software means estimate a variation in the xenon effect $\Delta X$ as a function of the difference $\Delta P$ in power and of the estimated duration DURATION of the variation in power entered by the operator.

According to an advantageous embodiment, this estimation of the variation in xenon $\Delta X$, during the variation in power, is proportional to the duration DURATION of the variation and to the amplitude of the power variation, and may be expressed by the relation:

$$\Delta X = Ax(\text{DURATION} \times \Delta P)$$

Where $\Delta X$ is the variation in the xenon effect expressed in pcm (for hundred thousand);

A is a proportionality coefficient expressed in pcm/(hour x % RP);

DURATION is the estimated duration of the variation in power expressed in hours;

$\Delta P$ is the difference in power expressed in % RP.

Nevertheless, the estimation of the variation in xenon is not limited to a linear model and may be carried out by means of a more complex computation model taking into account the inaccuracy of the linearity of the variation in xenon $\Delta X$ with the duration DURATION and the power difference $\Delta P$.

According to an embodiment variant, the estimation of the variation in xenon can also be a function of the estimated instant INST of load restoration so as to estimate more precisely the variation in xenon.

Thus, the variation in xenon $\Delta X$ during a rise or a drop in power is all the more important since the duration of this variation is considerable (in so far as the duration of this variation is typically below 7 hours). It is also considered as well as for a variation in power of which the time interval, to achieve the reference power Pc, is greater than one hour, and particularly for a power return, the evolution of xenon in the core of the reactor then becomes significant.

Figure 4A:
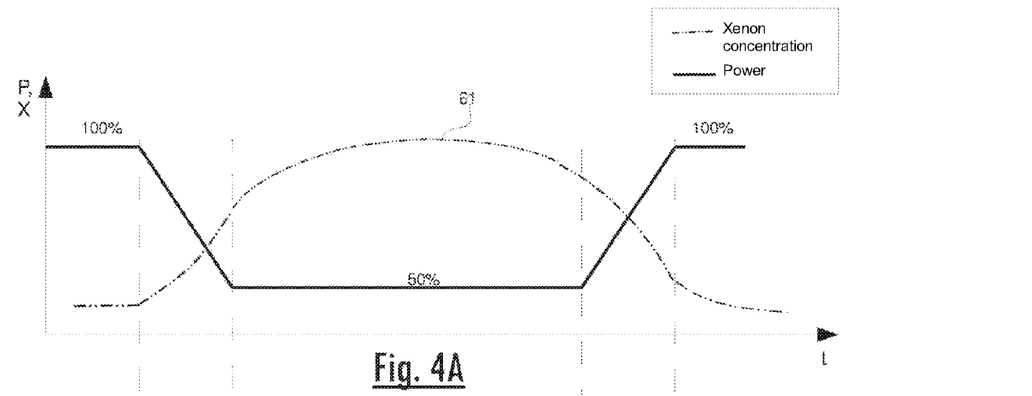
FIG. 4A represents in a schematic manner the evolution of the power during load follow as well as the evolution of the xenon concentration during this same load follow.

As the xenon concentration curve 61 of the diagram represented in FIG. 4A shows, the xenon effect appears as of the start of a drop in load and continues to vary during the lower power stage.

This estimated variation in the xenon effect $\Delta X$, during the time interval DURATION assigned to the variation in power, thus makes it possible to compensate the position dZ determined as a function of the power difference $\Delta P$, by the addition of a corrective factor dZc determined, during the step illustrated by block 48, by the relation:

$$dZ_c = f\{\Delta X\}$$

where f is an increasing function.

The reference position Z of the control rods is then determined by the combination of the position dZ and of the corrective factor dZc during the step illustrated by block 47.

Thus, in this second embodiment, it is not necessary to have available software means implementing a SMART type neutron code for determining an optimised reference position Z making it possible to minimise the movements of the control clusters.

Once the reference position Z of the control rods has been determined, the control and the regulation of the positions of the control rods in their reference positions Z are carried out in a conventional manner by known operating modes, by optionally compensating the movements of the rods by another control means for controlling the reactivity, such as for example the modification of the concentration of a neutron absorbing compound, such as boron, in the primary coolant by dilution/boronation operations.

Depending on the operating mode used, injections of boron or water will be used and/or the use of other control rod clusters more or less neutron absorbing that will be positioned in a strategic manner in the core.

For example, when it is possible, the return of the control rod clusters to their reference position is favoured by taking advantage of the variations in the xenon concentration rather than by dilution/boronation operations. As an example, if the reference position corresponds to a more extracted position than the position at which the clusters arrive following the load drop, the clusters are left to extract by compensating the increase in the xenon concentration, then the operation of dilution is only started when the clusters have returned to their reference position.

Figure 4B:
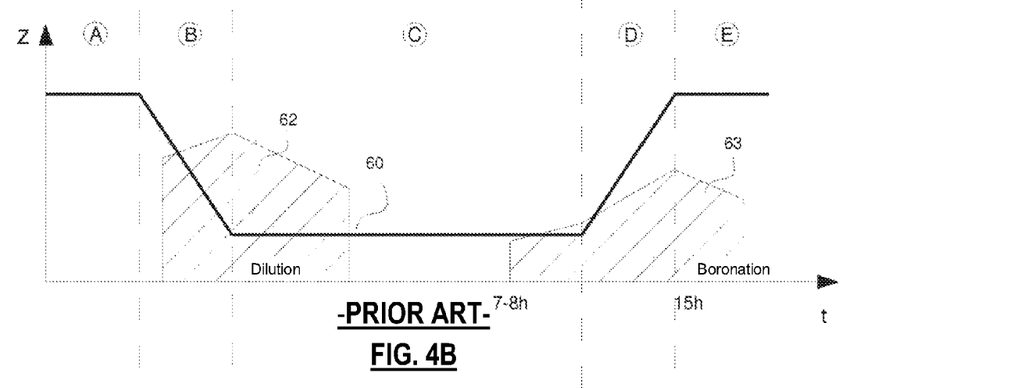
FIG. 4B represents in a schematic manner the evolution of the positions of the control rods as well as the evolution of the start of dilution and boronation of the primary coolant during the load follow represented in FIG. 4A with an operating method according to the prior art.
Figure 4C:
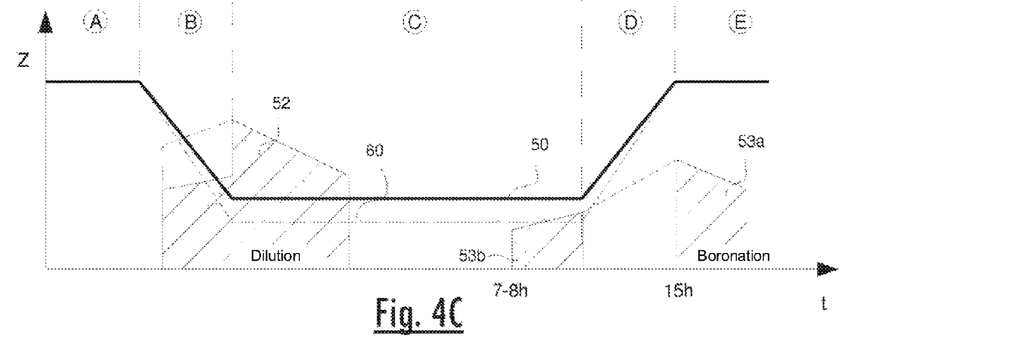
FIG. 4C represents in a schematic manner a comparison of the evolutions of the positions of the control rods as well as the evolutions of the dilution and boronation rate of the primary coolant during the load follow represented in FIG. 4A between the operating method illustrated in FIG. 4B and the operating method according to the invention.

The diagrams represented in FIGS. 4B and 4C illustrate the optimisation of the operation of a pressurized water nuclear reactor in load follow in comparison with an operating method not taking into account the xenon effect in the determination of the position Z of the control rods.

FIG. 4B illustrates more particularly the evolution of the positions of the control rods (curves 60) as well as the evolution of the rate of dilution and boronation of the primary coolant, according to a method of the prior art, during an example of load follow represented in FIG. 4A.

The hatched areas 62 and 63 represent respectively the volume of dilution water and the volume of boronation boron used during the load follow of FIG. 4A.

FIG. 4C represents the evolution of the positions of the control rods (curve 50) as well as the evolution of the dilution and boronation rate of the primary coolant, with the operating method according to the invention, during the load follow illustrated in FIG. 4A.

FIG. 4C also illustrates the evolution of the positions of the control rods (curves 60) as well as the evolution of the dilution and boronation rate of the primary coolant illustrated in FIG. 4B, by way of comparison.

The hatched areas 52, 53a and 53b represent respectively the volume of dilution water and the volume of the boronation boron used during the load follow of FIG. 4A.

The load follow, illustrated as an example in FIG. 4A, is a load follow in which a load drop (area B) is carried out from an upper stage at 100% of the rated power RP (area A) down to a lower stage (area C) equivalent to 50% of RP, during a relatively long period, of the order of ten hours, before a load restoration (area D) up to the return to the rated power represented in area E.

The power variations, power drop and power rise, are relatively long, of the order of two hours, with a rate of progression of the order of 0.5% of the rated power per minute. Typically, the power variations have a rate of progression less than or equal to 1% of the rated power per minute.

In FIG. 4C, the profile 50 in thick solid line shows schematically an example of evolution of the position Z of the control rods positioned in the vessel of the nuclear reactor, determined by the method according to the invention. In comparison, the profile 60 in solid line in FIG. 4B, and also represented in dotted line in FIG. 4C, schematically shows the evolution of the position Z of the control rods determined by an operating mode according to the prior art not taking into account the variation in the xenon effect during load follow.

Thus, the growth of the xenon effect (neutrophage element) intervening as of the load drop, illustrated by the curve 61 in FIG. 4A, is compensated by a lesser insertion of the control rods 40 into the core 30 of the reactor 100 during the load drop. The lesser insertion of the control rods 40 determined by the reference position Z allows the operator to reduce the boron dilution rate by reducing the volume of injected water (hatched area 52), or even to do away with the dilution, during the load drop (area B).

Thanks to the invention, the lesser insertion of the control rods 40 makes it possible to reduce the volume of dilution water, represented by the hatched area 52, during the load drop compared to the volume of dilution water represented by the hatched area 62, and consequently limits the volumes of effluents.

During load restoration (area D), the raising of the control rods being lesser, the variation in xenon during this load restoration is compensated by this lesser insertion of the rods, which makes it possible to stop the boronation flow rate during load restoration, in other words during the power rise from 50% to 100% of RP, as illustrated in FIG. 4C at the level of area D. Thus, during load restoration, the method according to the invention makes it possible to reduce the volume of boron injected into the primary coolant compared to the volume of boron injected with a known operating method (FIG. 4B).

In addition, the insertion of the control rods being lesser, the method according to the invention makes it possible to reduce the number of steps necessary during load follow and particularly between an upper stage and a lower stage. The method thus makes it possible to reduce the loads on control rod movement mechanisms.

Thus, the method according to the invention makes it possible to optimise the insertion of the control rods into the core in order to reduce the number of steps between different positions making it possible to preserve the means of movement of each control rod cluster during the years of service of the reactor.

The insertion of the control rod clusters to the reference position Z determined by the method according to the invention also makes it possible to control the power rise capacity corresponding to the power capable of being produced by said core 30 during the raising of the control rods.

This method is directly applicable to the different operating modes known to those skilled in the art, namely the operating modes commonly named mode A, mode G, mode X and mode T.

Operating mode G, known to those skilled in the art, takes into account during the determination of the insertion position of the control rods the eventuality of a rapid return to 100% of the rated power by the removal of the control rods.

To do this, operating mode G controls two types of control rod clusters having different neutron absorptivities. One of the clusters has its insertion position, which is a function of the level of power and guarantees the possibility of a rapid return to the rated power RP. The term "rapid" is taken to mean a sufficiently rapid load restoration in order for the variation in the xenon concentration to be slight, in other words a load restoration having a rate of progression typically comprised between 3% and 5% RP/min. The other control rod cluster, heavier, is dedicated to the control of the average temperature $T_{av}$ of the reactor, and indirectly by operations of dilution and boronation to the control of the axial distribution DA.

Operating modes X and T are advanced operating modes taking into account, in the positioning of the control rods, the power rise capacity $P_{max}$.

Power rise capacity $P_{max}$ is taken to mean the possibility of rapidly rising in power, in other words with a rate of progression comprised typically between 2% and 5% RP/min, from a reduced power to a high power (reference Pmax) defined beforehand by the operator during the programming of the load follow.

Thus, for power variations, and particularly for a slow power return, typically greater than one hour, the management of the insertion positions of the control rods is not optimal because it does not take into account the evolution of the xenon effect.

The method according to the invention makes it possible to take into consideration this evolution of xenon during a rise in power thereby making it possible to optimise the insertion of the control rods into the core of the reactor during "slow" load follow.

The method according to the invention, applied to operating modes G, T and X thus makes it possible to improve said modes by a lesser insertion of the different control rod clusters into the core of the reactor, thereby limiting the use of the injection of boron or water into the primary liquid necessary for the compensation of the xenon concentration in the coolant.

This method according to the invention is also applicable to the operating mode, called mode A, consisting in controlling and regulating the temperature $T_{av}$ and the axial distribution of power DA.

Operating mode A is the simplest mode used to operate nuclear reactors during load follow. When there is a load drop of the turbine, the control rods are inserted into the core in order to limit the power of the core and thereby avoid an increase in the temperature of the primary cooling circuit. In this operating mode, the control rods are inserted down to a lower limit level defining the acceptable limitation of perturbation of the axial distribution of power DA. When it is wished to further reduce the power, an injection of boron into the primary coolant is then carried out in order to increase its concentration and accompany the drop in the primary power. In the case of a power rise, a reduction in the concentration of boron is carried out by its dilution by injecting water.

However, the injection and the dilution of boron have a limited speed of action, which does not enable rapid or large amplitude power variations.

The method according to the invention, applied to operating mode A, thereby makes it possible to know the rate of progression at which the load restoration is possible without injection of water (i.e. without dilution). In fact, if the reference position determined by the method according to the invention is within the permitted limits, then the load restoration may be carried out with the rate of progression which is a function of the selected duration of variation in power. If the reference position determined by the method according to the invention is not on the other hand within the permitted limits, then it is possible to deduce the rate of progression associated with a coolant dilution rate, making it possible to remain within the permitted limits.

Obviously, the invention is not limited to the embodiments and to the operating modes that have been described. The method according to the invention is applicable to all types of operating mode known to those skilled in the art and not only to the operating modes mentioned in the present application.

Depending on the operating mode used, the reference position Z determined by the method according to the invention taking into account the variation in the xenon concentration $\Delta X$ may be applied to at least one control rod cluster if the nuclear reactor comprises a plurality of control rod clusters having different neutron absorption characteristics such as in particular in operating modes G, X and T.

The method according to the invention is also applicable to an operating mode limiting the volumes of effluents by the use of a control rod cluster inserted beforehand. In this operating mode, the inserted cluster makes it possible to take up the xenon effects (increase in the concentration) by extraction of the inserted cluster during load follow. The method according to the invention applied to this operating mode would make it possible to improve and optimise the placement of the cluster inserted beforehand so as to minimise the movements.

The method according to the invention has been particularly described in taking into account as an estimated duration the estimated time interval of the increase in power of the reactor to achieve the reference value starting from the effective value; nevertheless, the method according to the invention is also applicable by taking into account the estimated instant of load restoration, in other words the end of the estimated duration of the stage at the effective power before the increase in power, which makes it possible to further optimise the reference position Z of the control rods.

The method according to the invention has been particularly described by taking as estimated duration the estimated time interval of the variation in power of the reactor to achieve the reference value starting from the effective value; nevertheless, the method according to the invention is also applicable by replacing the estimated duration of the time interval of the increase in power by the slope of the increase in power of the reactor to achieve the reference value starting from the effective value, expressed for example in %/min.

The invention claimed is:

1. A method for operating a pressurized water nuclear reactor, said reactor comprising:
   a core producing power;
   a plurality of control rod clusters for controlling the reactivity of said core, said plurality of control rod clusters capable of occupying in the core a plurality of insertion positions staged vertically from an uninserted position;
   operating means for acquiring quantities representative of the operating conditions of the core;
   said method comprising the steps of:
   measuring an effective power of the nuclear reactor;
   acquiring a reference value for a desired target power of the nuclear reactor;
   acquiring an estimated duration of an amount of time needed for power to increase from said effective power to said reference value for the target power;
   determining a reference position of at least one control rod cluster among said plurality of control rod clusters, wherein the reference position is needed for acquiring said reference value for said desired target power, wherein the reference position is determined as a function of said estimated duration, of said measured effective power and of said reference value for said target power;
   acquiring an estimated point of time of the start of said power increase, said estimated point of time corresponding to an end of a stage of said effective power and being taken into account in the step of determining the reference position of at least one control rod cluster; and positioning said at least one control rod cluster in its reference position at or before said estimated point of time.

2. The method for operating a pressurized water nuclear reactor according to claim 1, further comprising regulating the concentration of a neutron absorbing element in the coolant as a function of said reference position of at least one control rod cluster among said plurality of control rod clusters by operations of dilution and/or boronation of the primary coolant of said nuclear reactor.

3. The method for operating a pressurized water nuclear reactor according to claim 2 wherein the neutron absorbing element is boron.

4. The method for operating a pressurized water nuclear reactor according to claim 1, wherein said step of determining said reference position of said at least one control rod cluster is carried out via software implementing a neutron code.

5. The method for operating a pressurized water nuclear reactor according to claim 1, wherein said step of determining said reference position of said at least one control rod cluster comprises:

a sub-step of determining a first position of at least one control rod cluster as a function of said measured effective power and of said reference value for the target power;

a sub-step of determining a variation in a concentration of xenon in said core of said reactor during the power increase, said variation in xenon concentration being a function of said estimated duration, and/or of said measured effective power and/or of said reference value for the target power; and a sub-step of determining a corrective factor of the position of at least one control rod cluster as a function of said variation in the xenon concentration.

6. The method for operating a pressurized water nuclear reactor according to claim 1, wherein said step of determining said reference position of said at least one control rod cluster comprises:

a sub-step of determining a first position of at least one control rod cluster as a function of said measured effective power and of said reference value for the target power;

a sub-step of determining a variation in a xenon concentration in said core of said reactor during the power increase, said variation in the xenon concentration being a function of said estimated duration, and/or of said measured effective power and/or of said reference value for the target power, and/or of said estimated point of time of the start of increase in power; and a sub-step of determining a corrective factor of the position of at least one control rod cluster as a function of said variation in the xenon concentration.

* * * * *